No. 693,840. Patented Feb. 25, 1902.
J. J. COX.
DRAFT EQUALIZER.
(Application filed June 3, 1901.)
(No Model.)
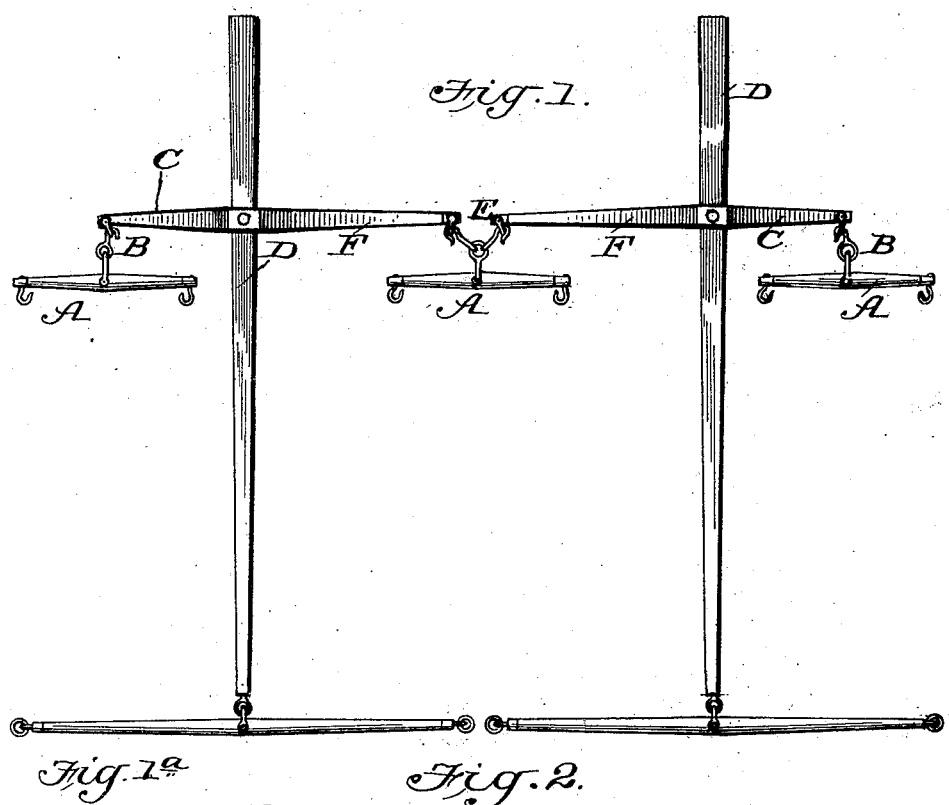
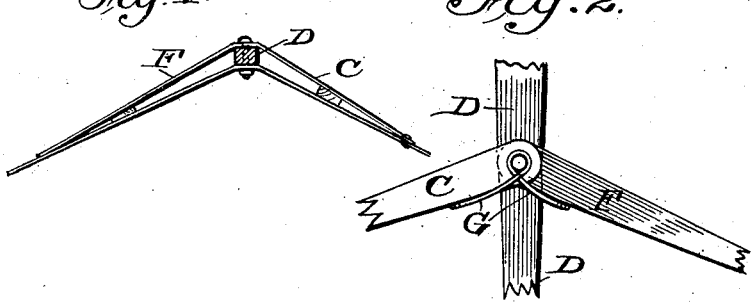
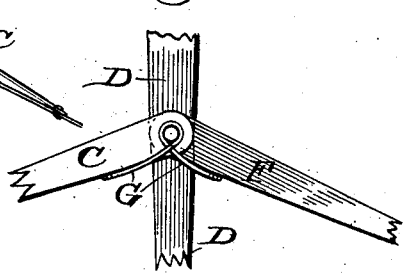
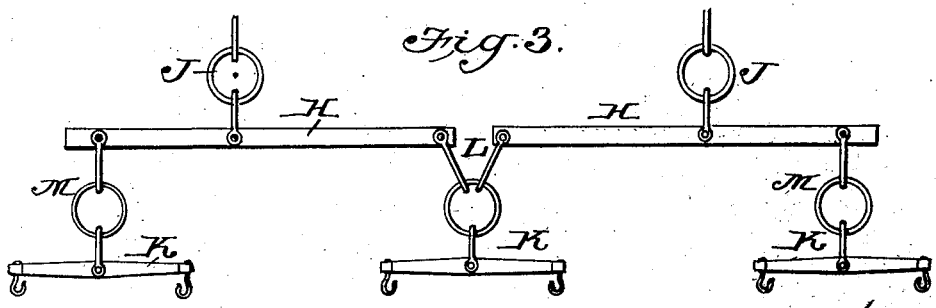
Witnesses
Jos. A. Ryan
Cha. J. Cusack
Inventor
Joshua J. Cox
by Wm A. Moore
Attorney

UNITED STATES PATENT OFFICE.

JOSHUA J. COX, OF WRIGHTSVILLE, ILLINOIS.

DRAFT-EQUALIZER.

SPECIFICATION forming part of Letters Patent No. 693,840, dated February 25, 1902.

Application filed June 3, 1901. Serial No. 62,911. (No model.)

*To all whom it may concern:*

Be it known that I, JOSHUA J. COX, a citizen of the United States, residing at Wrightsville, in the county of Greene and State of Illinois, have invented certain new and useful Improvements in Draft-Equalizers, of which the following is a specification.

My invention relates to improvements in draft-equalizers; and the object of my invention is the provision of a draft-equalizer which will insure an even and equal draft upon the horses and which will be of simple, inexpensive, and practical construction.

With this object in view my invention consists of a draft-equalizer embodying novel features of construction and combination of parts, substantially as disclosed herein.

Figure 1 represents a plan view of my draft-equalizer. Fig. 1ª is an edge view of the long and short arms with the pole in vertical cross-section. Fig. 2 represents a detail view of a portion of my equalizer, and Fig. 3 represents a plan view of a modified form of my invention.

My draft-equalizer is specially constructed for three horses and comprises the three singletrees A, of the same size, arranged in line, the outer trees having the central connection B with the short arms C, which are hinged to the pole D, and the central singletree having the double central connection E with the long arms F, which are also pivoted at their outer ends to the pole D. As seen in Fig. 1ª, the long and short arms are composed of plates or bars secured to the pole and at their outer ends secured to each other, being spaced by spacing-blocks, as shown, the two plates or bars of each arm being inclined with relation to each other. From this construction it will be seen that the singletrees are arranged in line and that when the draft is upon them the connection with the hinged or pivoted short and long arms, which are connected to the poles, will cause the three singletrees to distribute the draft evenly upon each horse, and thus prevent improper strain upon any one of the animals, and also that my novel construction and arrangement will enable the horses to pull in a straight course and start the vehicle or agricultural machine to which the draft is applied with ease.

In Fig. 2 I show the pivoted portion of the arms at the pole provided with a cushion or spring G, which will make the arms work with a soft and yielding action.

The arms in the form seen in Fig. 1ª are deflected so as to bring the singletrees in a plane below that of the poles, which I have found gives greater strength and takes the weight from the horses.

In the form of my invention shown in Fig. 3, which is particularly adapted for agricultural machinery—such as harrows, cultivators, and like machinery—I employ the two bars or rails H of equal size, and to said bars nearer their outer ends I connect the ring-clevises J, which are connected to the harrow or other implement, and, as in the other form, I use the three similar singletrees K, which are connected to the bars in the same manner by the central connection L and the end connections M, the main point in this form being the placing of the clevises nearer the outer ends of the bars, which avoids the zigzag motion so common where the connection is made directly at the center in the use of three singletrees.

In use the three horses are attached to the three singletrees, and when they start the draft is evenly distributed upon said trees, which all take their even part of the draft, which is accomplished by the peculiar construction and arrangement of the bars, as is evident.

I claim—

In a draft-equalizer, the combination with a pole, of long and short arms secured thereto and consisting of the oppositely-disposed inclined plates secured together at their outer ends and spacing-blocks between said plates near their outer ends, all substantially as shown and described.

In testimony whereof I affix my signature in presence of two witnesses.

JOSHUA J. COX.

Witnesses:
W. R. JOLLEY,
W. B. TIETSORT.